(12) United States Patent
Kouros (10) Patent No.: US 12,533,773 B2
(45) Date of Patent: Jan. 27, 2026

(54) VACPAD TOOL ASSEMBLY AND METHOD

(71) Applicant: KOUROS CARPENTRY CORP, Burr Ridge, IL (US)

(72) Inventor: Dino Kouros, Burr Ridge, IL (US)

(73) Assignee: KOUROS CARPENTRY CORP, Burr Ridge, IL (US)

( * ) Notice: Subject to any disclaimer, the term of this patent is extended or adjusted under 35 U.S.C. 154(b) by 852 days.

(21) Appl. No.: 17/848,763

(22) Filed: Jun. 24, 2022

(65) Prior Publication Data

US 2023/0330818 A1     Oct. 19, 2023

Related U.S. Application Data

(60) Provisional application No. 63/214,485, filed on Jun. 24, 2021.

(51) Int. Cl.
*B25B 11/00*     (2006.01)

(52) U.S. Cl.
CPC .................. *B25B 11/005* (2013.01)

(58) Field of Classification Search
CPC ..... B25B 11/00; B25B 11/005; B25B 11/007; B23Q 3/08; B23Q 3/088; B23Q 1/037; H01L 21/6838
USPC ............. 269/20, 21, 55, 56, 71, 73, 74, 309; 29/559
See application file for complete search history.

(56) References Cited

U.S. PATENT DOCUMENTS

| | | | |
|---|---|---|---|
| 3,787,039 A | 1/1974 | Zeichman | |
| 3,907,268 A | 9/1975 | Hale | |
| 4,066,249 A | 1/1978 | Huber et al. | |
| 6,439,559 B1 | 8/2002 | Kinnard et al. | |
| 6,585,244 B2 * | 7/2003 | Goeckel | B23Q 1/032 269/21 |
| 7,127,309 B2 * | 10/2006 | Dunn | B29C 64/40 269/291 |
| 9,724,806 B2 | 8/2017 | Thibaut | |
| 10,780,553 B2 | 9/2020 | Wang | |
| 2013/0270757 A1 * | 10/2013 | Thibaut | B23Q 1/037 269/21 |

FOREIGN PATENT DOCUMENTS

| | | |
|---|---|---|
| CN | 101537995 B | 10/2011 |
| CN | 107511779 A | 12/2017 |

(Continued)

OTHER PUBLICATIONS

KR20110097369—Machine Translation (Year: 2011).*

*Primary Examiner* — Monica S Carter
*Assistant Examiner* — Alberto Saenz
(74) *Attorney, Agent, or Firm* — MARSHALL, GERSTEIN & BORUN LLP (57) ABSTRACT

A vacpad tool assembly for securing a workpiece includes a body adapted to be removably attached to a surface, coupled to a vacuum source, and including a top portion and two side walls. A bore is formed in the top portion and each of the side walls, and each bore is coupled to at least one other bore within the body. In addition, a valve is disposed in the bore formed in the top portion of the body and extends onto the top portion of the body. So configured, upon engagement of a workpiece with the valve, the valve is moved to an open position, allowing air from the vacuum source to be drawn into and through the bore to secure the workpiece to the body.

10 Claims, 9 Drawing Sheets

(56) References Cited

FOREIGN PATENT DOCUMENTS

| | | | | |
|---|---|---|---|---|
| CN | 108994637 B | 7/2019 | | |
| DE | 202009004659 U1 | 8/2010 | | |
| KR | 20110097369 A | * 8/2011 | ............... | B25H 1/18 |
| KR | 101227148 B1 | 1/2013 | | |
| WO | WO-96/33049 A1 | 10/1996 | | |

* cited by examiner

VACPAD TOOL ASSEMBLY AND METHOD

CROSS-REFERENCE TO RELATED APPLICATION

This application claims the benefit of the filing date of U.S. Provisional Patent Application No. 63/214,485, filed Jun. 24, 2021, the entirety of which is hereby incorporated by reference.

TECHNICAL FIELD

The present disclosure relates to tools for securing parts during construction and, more specifically, to a vacpad tool assembly and method using a vacuum to secure a workpiece.

BACKGROUND

It is known to use a suction device to secure parts, and some conventional devices are used in the construction industry. However, such conventional devices include large parts, with only a few select sizes, reducing both the adaptability and flexibility of the conventional devices in many applications. Such limitations have reduced the value of conventional devices, making them less desirable and often unworkable in many areas of the construction industry. In addition, such conventional devices are frequently expensive, adding to their lack of desirability.

SUMMARY

In accordance with a first exemplary aspect, a vacpad tool assembly for securing a workpiece is disclosed. The vacpad tool assembly comprises a body adapted to be removably attached to a surface and coupled to a vacuum source. The body includes a top portion and two side walls, and a bore is formed in the top portion and each of the side walls. Upon contact of a workpiece with the top portion of the body, air from the vacuum source is allowed to be drawn into and through the bore in the top portion to secure the workpiece to the body.

In accordance with another exemplary aspect, a portable vacpad tool assembly comprises a vacpad tool assembly including a body adapted to be removably attached to a surface and coupled to a vacuum source. The body includes a top portion, two side walls, and a rear portion, and a bore is formed in each of the top portion, at least one side wall, and the rear portion. In addition, a tilting mount is coupled to the body, and the tilting mount has a locking pin and is adapted to receive the body and dispose the body at a desired position. The locking pin is adapted to be secured the body at the desired position on the titling mount. Upon engagement of a workpiece with the top portion of the body, air from the vacuum source is allowed to be drawn into the bore of the top portion to secure the workpiece to the body of the vacpad tool assembly.

A vacpad tool assembly for securing a workpiece, the vacpad tool assembly comprising a body adapted to be removably attached to a surface and coupled to a vacuum source. The body includes a top portion, a bottom portion, and two side walls. The bottom portion includes a groove along the length of a front area of the body and one side wall. A bore is formed in the top portion, the bottom portion, and each of the side walls, and each bore is coupled to at least one other bore within the body. A valve is disposed in the bore formed in the top portion of the body. The valve extends onto the top portion of the body and is moveable between a closed position and an open position. Upon contact of a workpiece with the valve, the valve is moved to an open position, allowing air from the vacuum source to be drawn into the bore in the top portion of the body to secure the workpiece to the body.

A method of securing a workpiece using a vacpad tool assembly comprises coupling a body of a vacpad tool assembly to a vacuum source, and the body includes a top portion and two side walls. The method further includes coupling a bore formed in the top portion and at least one side wall to each other via vacuum from the vacuum source, and applying the vacuum from the vacuum source. The method also includes contacting a workpiece with the top portion of the body of the vacpad tool assembly, allowing air to be drawn into and through the bore of the top portion of the body to secure the workpiece to the body.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, and in which:

DETAILED DESCRIPTION

A vacpad tool assembly for securing a workpiece to a surface is disclosed. The vacpad tool assembly comprises a body adapted to be removably attached to a surface and coupled to a vacuum source. The body includes a top portion, two side walls, and a rear wall. A bore is formed in the top portion, at least one side wall, and the rear wall, and each bore forms an air channel within the body and is coupled to at least one other bore within the body. A valve is disposed in the bore formed in the top portion of the body and extends onto the top portion of the body. The valve is moveable between a closed position and an open position, such that upon application of a vacuum from the vacuum source in at least one bore of the body and contact of a workpiece with the valve, the valve is moved to an open position, allowing air from the vacuum source to be drawn into and through the bore to secure the workpiece to the body.

Figure 1:
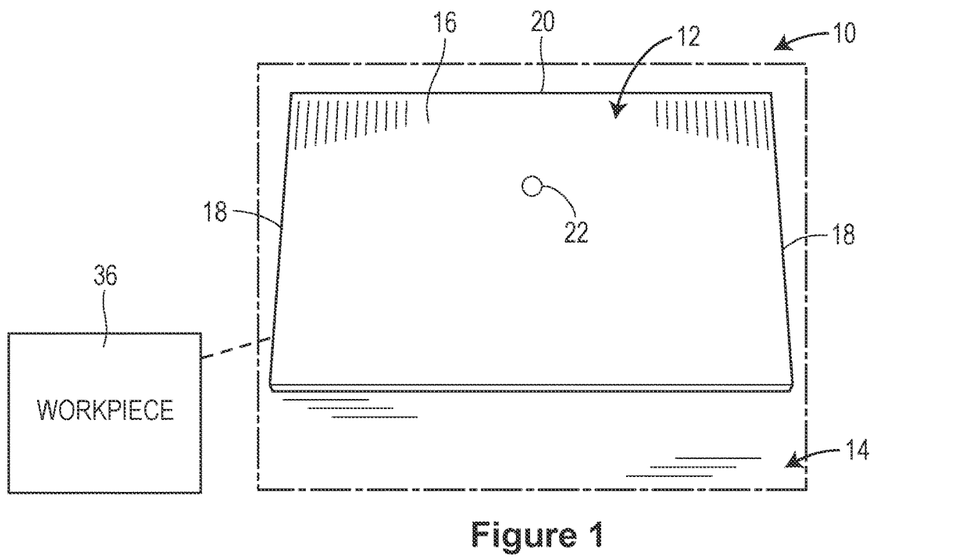
FIG. 1 is a top perspective view of a vacpad tool assembly according to one aspect of the present disclosure.
Figure 2:
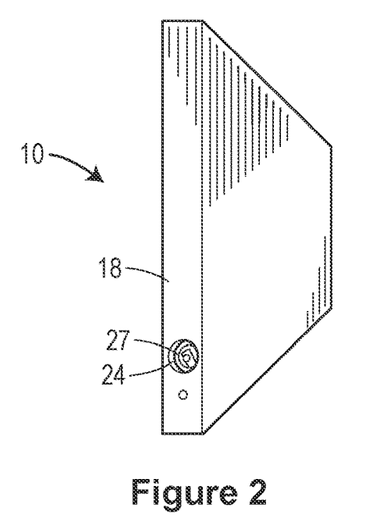
FIG. 2 is a side view of the vacpad tool assembly of FIG. 1.
Figure 3:
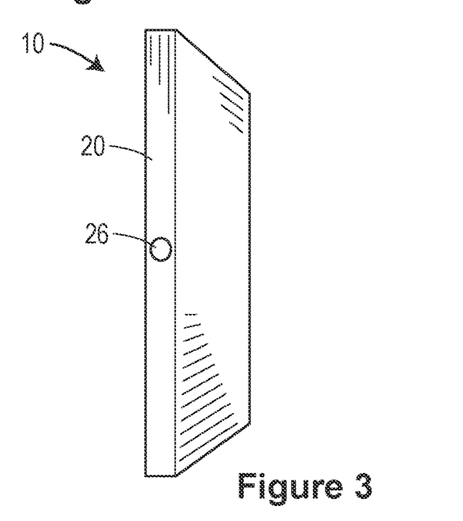
FIG. 3 is a rear view of the vacpad tool assembly of FIG. 1.

Referring now to FIGS. 1-3, a vacpad tool assembly 10 of the present disclosure is depicted. The vacpad tool assembly 10 includes a body 12 adapted to be removably attached to a surface 14, such as a table or floor surface, in one example. The body 12 is also adapted to be coupled to a vacuum source, as explained more below. and includes a top portion 16, two side walls 18, and a rear wall 20. A bore 22 is formed in the top portion 16, another bore 24 is formed in each side wall, as depicted in FIG. 2, and still another bore 26 is formed in the rear wall, as depicted in FIG. 3. Each bore 22, 24, 26 forms an air channel within the body 12 and is coupled to at least one other bore 22, 24, 26 within the body 12, for example. In addition, the bore 24 formed in the side wall 18 is adapted to receive a valve 27, such as a release valve, as explained more below.

Figure 4A:
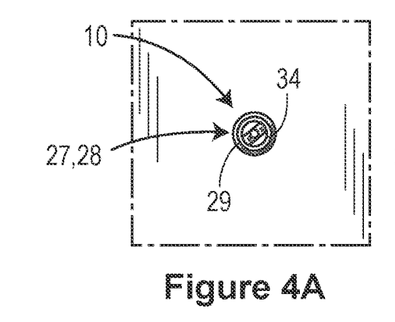
FIG. 4A is a top, perspective view of a valve of the vacpad tool assembly of FIG. 1.
Figure 4B:
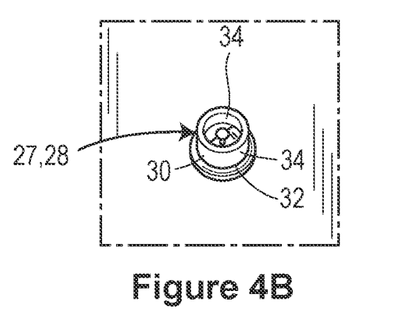
FIG. 4B is a bottom, perspective view of the valve of FIG. 4A.

Referring now to FIGS. 4A and 4B, a valve 28 is depicted, and the valve is adapted to be disposed in the bore 22 of the top portion 16 of the body 12 of the vacpad tool assembly 10. Once disposed in the bore 22, the valve 28 extends onto the top portion 16 of the body 12. The valve 28 is moveable between a closed position and an open position, as explained more below. In addition, the valve 28 may be a spring-loaded ball valve or any other valve that functions in the same manner as the valve 28 and still fall within the scope of the present disclosure. As depicted in FIG. 4A, the valve 28 includes a top portion 29. The valve 28 also includes a bottom portion 30 having a bore 32 for receiving a spring, such as in the spring-loaded ball valve example referred to above. As will be appreciated, the valve 28 may be manufactured according to any standard manufacturing techniques, including one or more additive manufacturing techniques, and still fall within the scope of the present disclosure.

Upon engagement of one or more of a material or a workpiece 36 (FIG. 1) with the top area 29 of the valve 28 extending onto the top portion 16 of the body 12 of the vacpad tool assembly 10, the valve 28 is moved to an open position. This allows air from a vacuum source to be drawn into and through the bore 22 to secure the material or the workpiece 36 to the top portion 16 of the body 12. More specifically, in one example, a spring-loaded member 34, such as a spring, disposed within the bore 32 of the bottom area 30 moves downward from the force of the material or workpiece 36 being placed onto the valve 28. This downward movement, moves the spring-loaded member away from the top area of the valve 28 to create an opening for air from the vacuum source to flow. In addition, upon application of the vacuum from the vacuum source in at least one bore 22, 24, 26, the body 12 may also be secured to a resting surface, such as the surface 14, of FIG. 1.

In addition, the valve 27 disposed in the bore 24 of the side wall 18 of the body 12 may be the same as the valve 28 described above and depicted in FIGS. 4A and 4B. In this example, the valve 27 is moved to an open position, which allows air from the vacuum source to flow through the bore 26. This releases the air suction of the bore 28 disposed on the top portion 16 of the body 12, allowing the workpiece secured thereto to be easily removed, for example.

In some examples, the body 12 of the vacpad tool assembly 10 comprises an HDPE material. It will be appreciated that the body 12 may include various other materials and still fall within the scope of the present disclosure.

Referring now to FIGS. 5-7B, a portable vacpad tool assembly 100 is depicted. The portable vacpad tool assembly 100 includes the same vacpad tool of the vacpad tool assembly 10 depicted in FIGS. 1-4B, but also includes a tilting mount, as described more below. Because the vacpad tool of the portable vacpad tool assembly 100 is the same as the vacpad tool of the vacpad tool assembly 10, the same reference numbers used for the vacpad tool assembly 10 of FIGS. 1-4B are used again in FIGS. 5-7B and not explained again for the sake of brevity.

Figure 5:
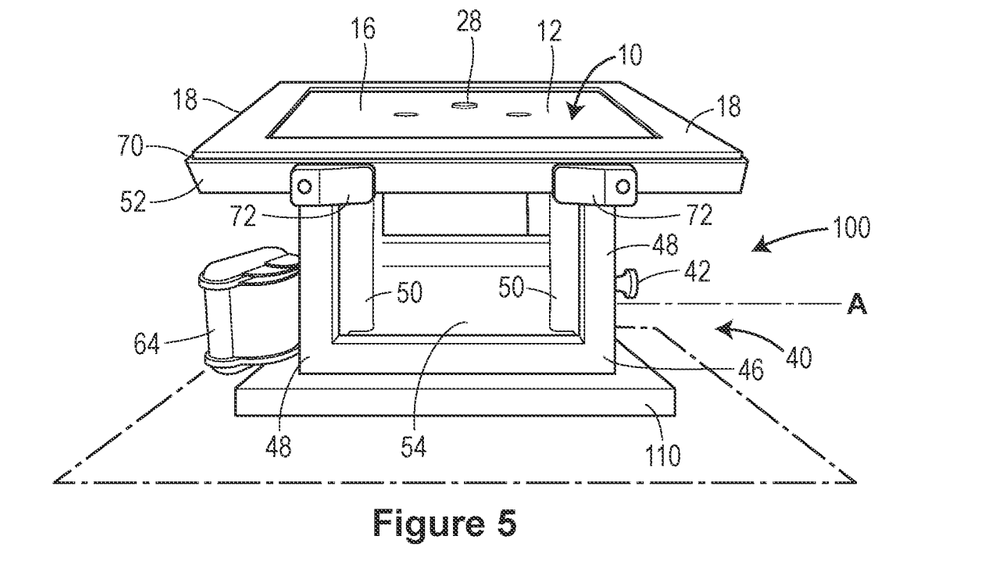
FIG. 5 is a front perspective view of a portable vacpad tool assembly according to another aspect of the present disclosure.

The portable vacpad tool assembly 100 includes the vacpad tool assembly 10 including the body 12 having the top portion 16 and side walls 18, and the bore 22 formed in the top portion 16. The ball valve 28 is disposed in the bore 22 in the top portion 16 of the body 12, as depicted in FIG. 5, and extends onto the top portion 16 of the body 12. The ball valve 28 is moveable between the closed position, in which a portion of the ball valve 28 extends outside of the top portion 16 of the body, and an open position. The open position is a position in which a portion of the ball valve 28 not extending outside of the top portion 16 of the body 12, but instead is pushed into the bore 22 of the top portion 16 of the body 12, such as by the force of the workpiece contacting the top portion 16 of the body 12.

The portable vacpad tool assembly 100 also includes a mount 40, such as a tilting mount 40, that is coupled to the body 12 of the vacpad tool assembly 10. The tilting mount 40 includes a locking pin 42 and is adapted to receive the body 12, as explained more below, and disposed the body 12 at a desired position. The locking pin 42 is adapted to secure the body 12 at the desired position on the titling mount 40. In this example, the vacpad tool assembly 10 is a first vacpad tool assembly, and the portable vacpad tool assembly 100 further comprises a second vacpad tool assembly 110 onto which the tilting mount 40 is disposed, as explained more below.

Specifically, the tilting mount 40 includes a stand 46 disposed on the second vacpad tool assembly 110 and having two side walls 48. In addition, a pair of mounting members 50 is disposed within the two side walls 48, and at least one mounting member 50 includes an aperture for receiving a portion of the locking pin 42 to secure the mounting member in the desired position. Further, a mounting plate 52 is disposed on the pair of mounting members 50 and receives the body 12 of the vacpad tool assembly 10, as depicted in FIG. 5, for example.

The mounting members 50 are rotatable about a lateral axis A of the tilting mount 40. Specifically, upon moving the locking pin 42 out of the aperture of the at least one mounting member 50, each of the mounting members 50 is able to be rotated about the lateral axis A within the side walls 48 of the tiling mount 40. In one example, the mounting members 50 of FIG. 5 are disposed an angle from the lateral axis A, such that the top portion 16 of the vacpad tool assembly 10 is disposed about 90 degrees, such as approximately perpendicular to, the lateral axis A. The mounting members 50 may be rotated from the position in FIG. 5, for example, to any angle through 90 degrees. In another example, the mounting members 50 may be rotated such that the top portion 16 of the vacpad tool assembly 10 is disposed in a position that is approximately parallel to the lateral axis A.

Figure 7A:
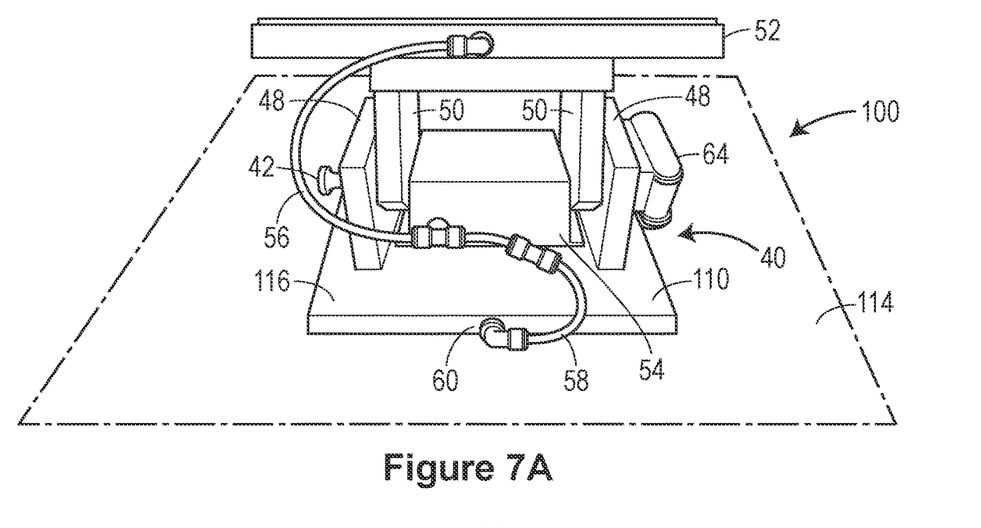
FIG. 7A is a rear view of the portable vacpad tool assembly of FIG. 5.

The portable vacpad tool assembly 100 also includes a vacuum source 54, as best shown in FIGS. 5 and 7A, disposed in the stand 46 between the side walls 48. The vacuum source 54 may be a vacuum motor or other device capable of providing a vacuum, an air stream or a negative pressure source, for example. The vacuum source 54 also includes at least one tube 56 extending therefrom and coupled to the bore 26 in the rear portion 20 of the body 12, as depicted in FIG. 7A. In another example, the vacuum source 54 also include another tube 58 extending therefrom and coupled to a bore 60 disposed in a rear portion of the body 116 of the second vacpad tool assembly 110, as also best depicted in FIG. 7A.

Still further, a battery 64 is also disposed on the second vacpad tool assembly 110 and coupled to one of the side walls 48 of the mount 40. The battery 64 provides power to the vacuum source 54 to create a negative pressure source and/or a vacuum, when needed. At least because the battery 64 is contained in the portable vacpad tool assembly 100, the vacpad tool assembly 100 is able to be portable and does not rely on an external power source, such as a wired power source, for example.

One side wall 48 of the stand 66 of the tilting mount 40 may include a bore. The bore is configured to receive at least a portion of the locking pin 42 to secure one of the mounting members 50 to the side wall 48 and maintain a desired position of the mounting member 50. By doing so, ultimately the desired position of the mounting plate 52 on which the body 12 of the vacpad tool assembly 10 is disposed is also maintained.

As depicted in FIG. 5, the mounting plate 52 includes an edge 70 surrounding the mounting plate 52, and the edge 70 is configured to help secure the body 12 of the vacpad tool assembly 10 on the mounting plate 52. The mounting plate 52 further includes a pair of rotating tabs 72 disposed on the edge 70, such as the front edge, as depicted in FIG. 5. Each rotating tab is moveable to a substantially vertical position in which the rotating tabs 72 contact the body 12 of the vacpad tool assembly 10 disposed on the mounting plate 52, and a substantially horizontal position. The substantially horizontal position is a position in which the rotating tabs 72 are removed from contact with the body 12 of the vacpad tool assembly 10, allowing the body 12 to be removed from the mounting plate 52 when desired.

Figure 6:
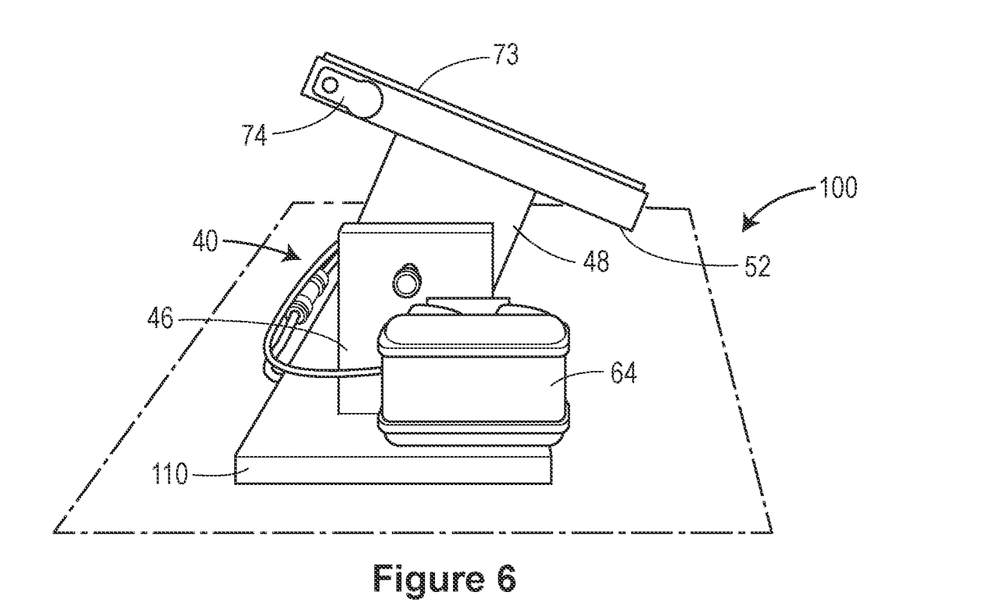
FIG. 6 is a side view of the portable vacpad tool assembly of FIG. 5.

As depicted in FIG. 6, the mounting plate 52 further comprises a side wall 73, and a tab 74 is disposed on the side wall 73. The tab 74 is moveable between a first position and a second position. The first position is a position in which the tab 74 is pushed to contact a valve disposed immediately adjacent to and underneath the tab 74, such as a release valve, disposed in the side wall 73 to move the valve to an open position. Such movement and contact thus release suction from the bore 20 disposed in the top portion 16 of the body 12 of the first vacpad tool assembly 10 of the portable vacpad tool assembly 100, allowing the workpiece secured thereto be easily removed/released from the top portion 16. The second position is a position in which the tab 74 is not pushed to contact the valve, but rather sits just adjacent to and over the valve. Thus, the valve is in a closed position in the second position of the tab 74.

Figure 7B:
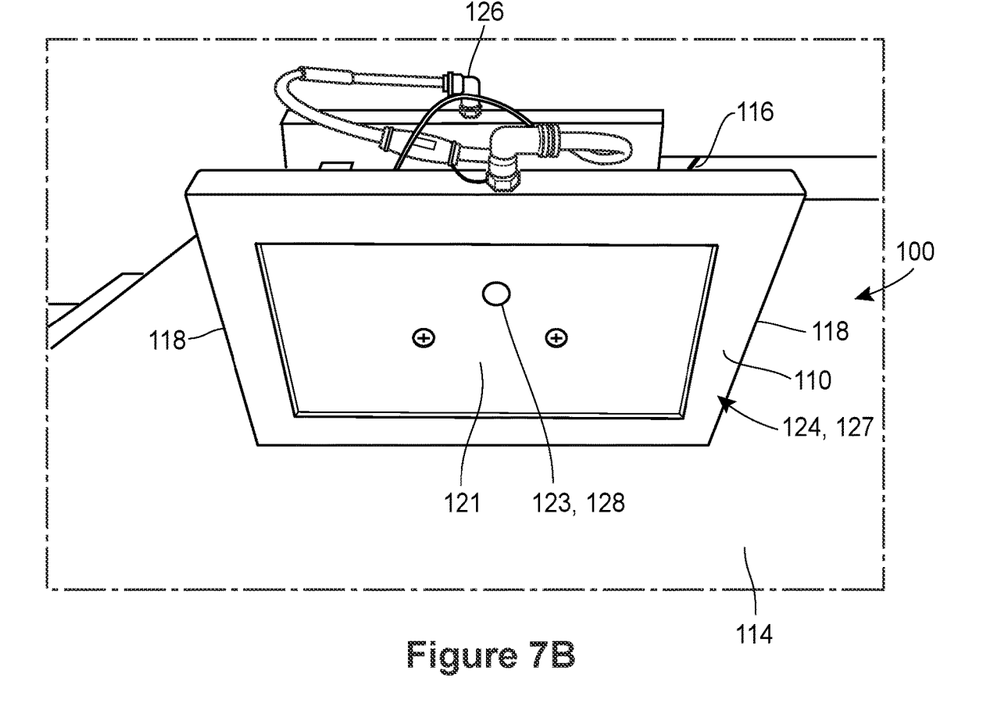
FIG. 7B is a bottom, perspective view of the portable vacpad tool assembly of FIG. 7A.

Referring now to FIG. 7B, the second vacpad tool assembly 110 is depicted. The second vacpad tool assembly 110 includes a body 112 adapted to be removably attached to the surface 114 and coupled to the vacuum source 54. The body 112 includes a top portion 116, two side walls 118, a rear wall 120, and a bottom portion 121. A bore 122 is formed in the top portion 116, at least one bore 124 is formed in at least one side wall 118 each of the side walls 118, a bore 123 is formed in the bottom portion 121, and another bore 126 is formed in the rear wall 120 of the body 112. Upon engagement of the surface 114 with the bottom portion 121 the body 112 of the second vacpad tool assembly 110, air from the vacuum source 54 is drawn into the bore 123 of the bottom portion 121 to secure the bottom portion 121 of the body 112 of the second vacpad tool assembly 110 to the surface 114.

As depicted in FIG. 7B, the second tube 58 extending from the vacuum source 54 is coupled to the bore 126 disposed in the rear wall 120 of the second vacpad tool assembly 110. In addition, another valve 128, such as a check valve or a spring-loaded ball valve, is disposed within the bore 123 of the bottom portion 121. So configured, upon application of the vacuum from the vacuum source 54 and through the second tube 58 and contact of the bottom portion 121 with a surface 114, the valve 128 moves to an open position and the body 112 of the second vacpad tool assembly 110 is secured to the surface 114 via the vacuum of the vacuum source 54.

Figure 8:
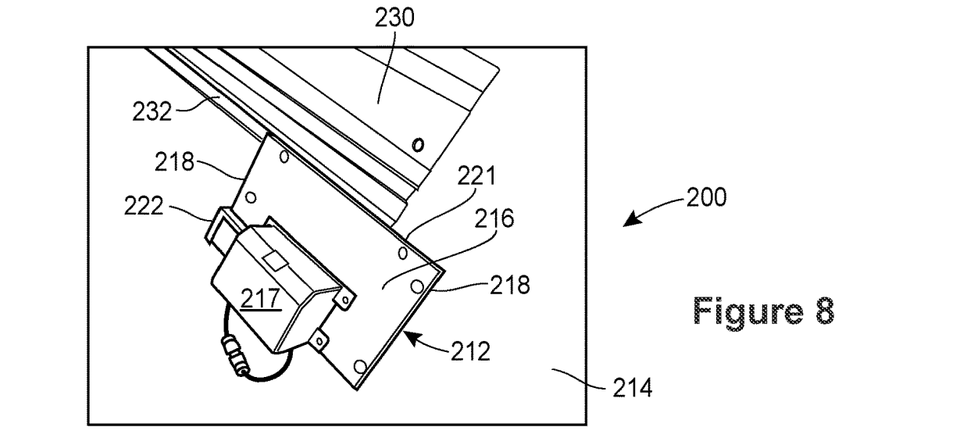
FIG. 8 is a top perspective view of another vacpad tool assembly according to another aspect of the present disclosure.
Figure 9:
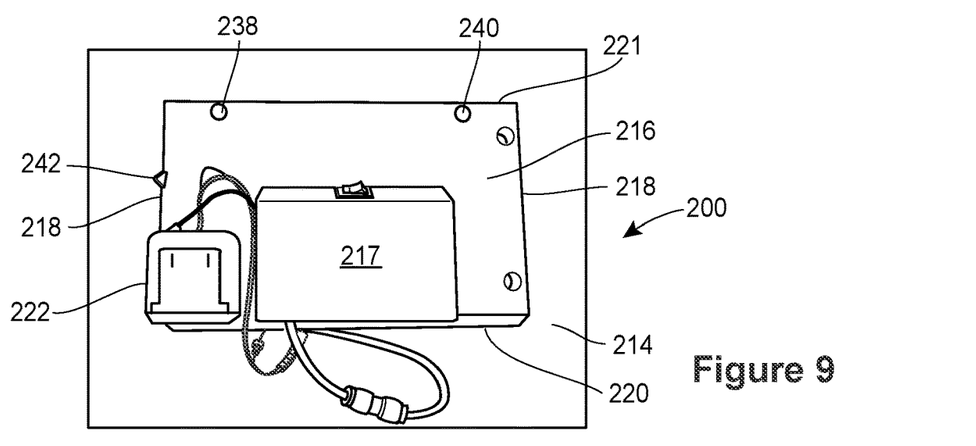
FIG. 9 is a top view of the vacpad tool assembly of FIG. 8.
Figure 10:
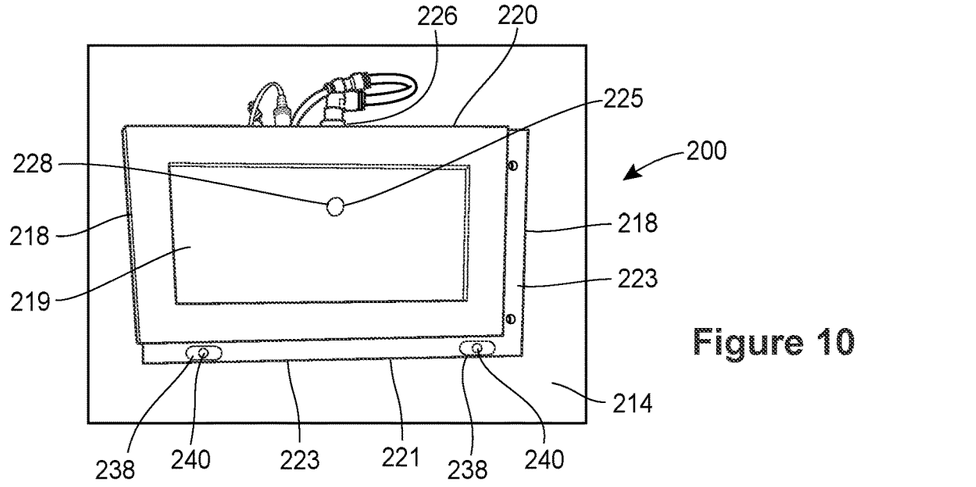
FIG. 10 is a bottom view of the vacpad tool assembly of FIG. 8.

Referring now to FIGS. 8-10, another vacpad tool assembly 200 is depicted. The portable vacpad tool assembly 100 includes a body similar to the vacpad tool 10 of the vacpad tool assembly 10 of FIGS. 1-4B, but also includes a groove on a bottom portion of the body of vacpad tool assembly 100, as described more below. Parts of the vacpad tool assembly 200 that are similar to or the same as parts of the vacpad tool assembly 10 of FIGS. 1-4B are numbered 200 more and may not all be described again here for the sake of brevity.

As depicted in FIGS. 8 and 9, the vacpad tool assembly 200 includes a body 212 adapted to be removably attached to a surface, such as the surface 214. The body 212 includes a top portion 216 having a vacuum source 217, such as a vacuum motor, disposed on the top portion 216, two side walls 218, a bottom portion 219 (as depicted in FIG. 10), a rear portion 220, and a front portion 221. A power supply 222 is also disposed on the top portion 216 of the body 212 adjacent to the vacuum source 217, allowing the vacpad tool assembly 200 to also have a portable power source.

Referring now to FIG. 10, the bottom portion 219 includes a groove 223 along both the length of one side wall 218 and the front portion 221 of the body 212. A bore 225 is formed in the bottom portion 219 and another bore 226 is formed in the rear portion 220 of the body 212. Each bore 225, 226 forms an air channel within the body 212 and may be coupled to the other bore 225, 226. A valve 228, such as a ball valve, may be disposed in the bore 225 formed in the bottom portion 219 of the body 212, as also depicted in FIG. 10, such that the ball valve 228 slightly extends out of the bottom portion 219 when in a closed position and is moveable between a closed position and an open position. Upon one or more of contact or engagement with the surface 214, or any other resting or mounting surface, the valve 28 is moved from the closed position, in which air or a vacuum from the vacuum source 217 is not able to flow through the bore 225 of the bottom portion 219, to an open position. The open position is a position in which air from the vacuum source 217 is allowed to be drawn into and through the bore 225 of the body 212 to secure the body 212 to the surface 214, for example. Thus, upon application of a vacuum, such as negative pressure, from the vacuum source 217 disposed on the body 212 of the vacpad tool assembly 200 and contact of the body 212 with the surface 214, the body 212 is secured to the surface 214.

As depicted in FIG. 8, the groove 223 of the body 212 of the vacpad tool assembly 200 is configured to be coupled to a portion of a track saw 230 or other construction tool. In this example, the groove 223 receives a portion of an elongated projection 232 of the track saw 230 to secure the track saw 230 to the body 212 when the body 212 is secured to the surface 214 by the vacuum source 217. In this way, the track saw 230 is mounted in place to the body 212 of the vacpad tool assembly 200, which is in turn safely and securely mounting to the surface 214, for example, or any other work surface by way of the vacuum from the vacuum source 217, as explained above. While the track saw 230 is depicted in FIG. 8, it will be appreciated that the groove 223 of the body 212 of the vacpad tool assembly 200 may alternatively receive a portion of another construction tool, different from the track saw 230, and still fall within the scope of the present disclosure.

Referring back to FIG. 10, the groove 223 disposed along the front portion 221 of the body 212 includes a pair of holes 238, each hole 238 including a bolt 240.

In addition, and as best depicted in FIG. 9, the body 212 may further include a release valve 242 disposed in one of the side walls 218. The release valve 242 is moveable between an open position and a closed position. The open position is a position in which air or vacuum from the vacuum source 217 is able to flow through a bore in which the release valve 242 is disposed, allowing the body 212 of the vacpad tool assembly 200 to be easily removed and/or detached from the surface 214, for example. The closed position is a position in which air or the vacuum from the vacuum source 217 is unable to flow through the bore in which the release valve 242 is disposed, such that the bottom portion 219 of the body 212 is secured to the surface 214 by the vacuum.

Figure 11:
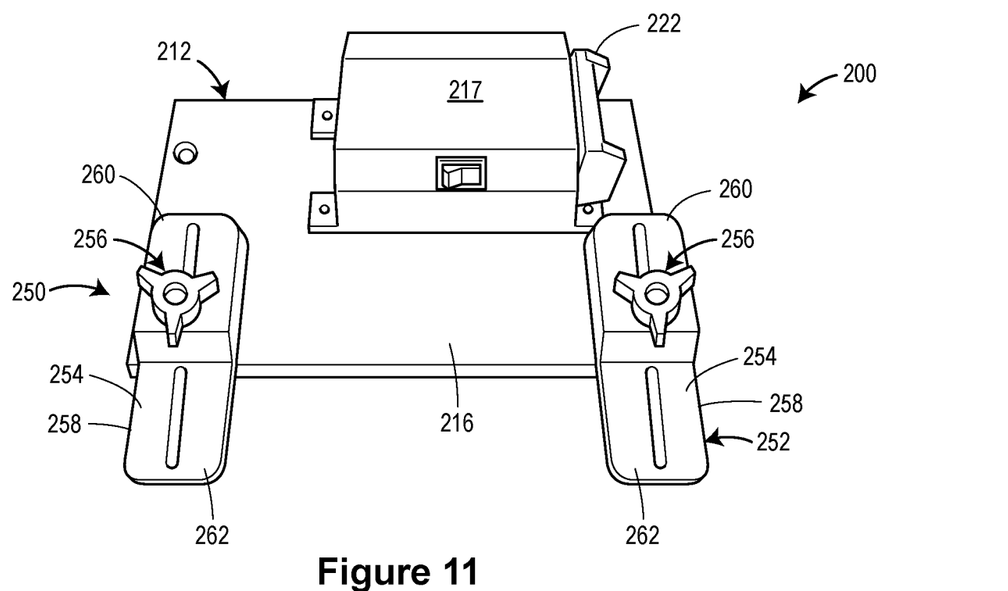
FIG. 11 is a top perspective view of the vacpad tool assembly of FIG. 9 having a support system coupled thereto.
Figure 12:
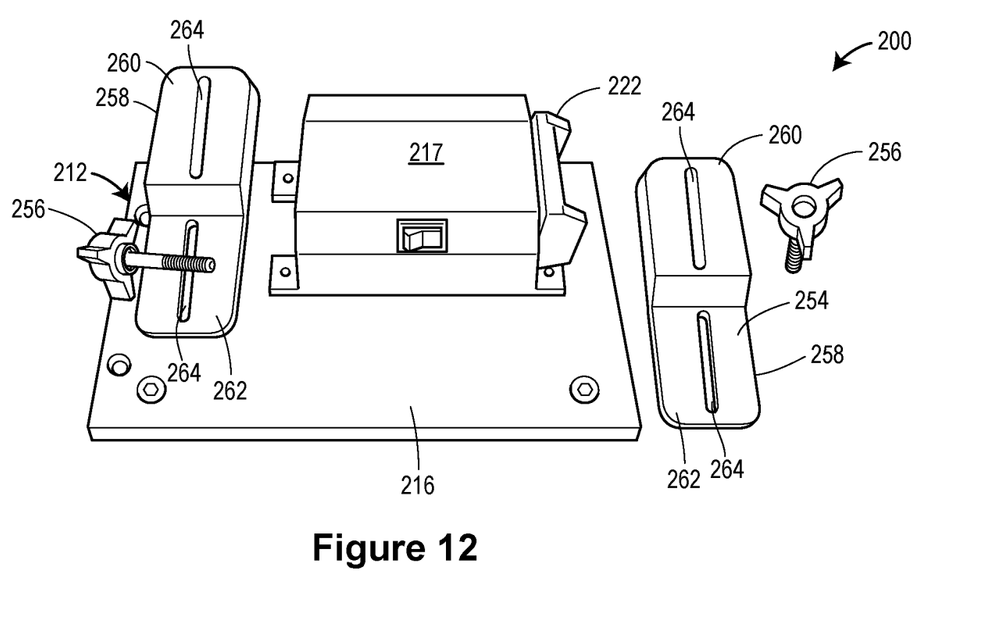
FIG. 12 is another top perspective view of the vacpad tool assembly of FIG. 11.
Figure 13:
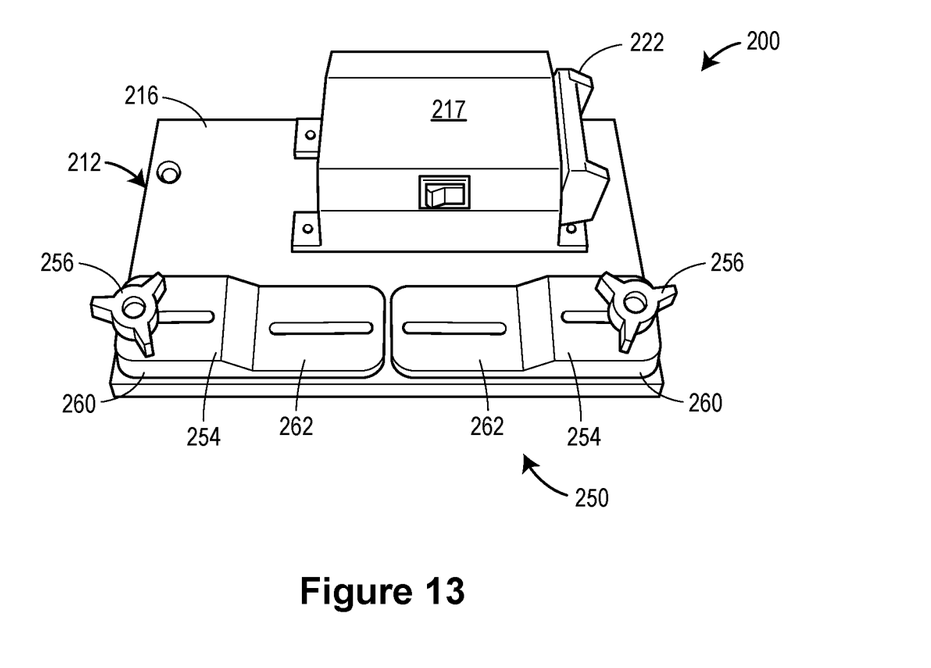
FIG. 13 is yet another top perspective view of the vacpad tool assembly of FIG. 11.

Referring now to FIGS. 11-13, the vacpad tool assembly 200 of FIGS. 8-10 is depicted with a support system 250. In this example, the vacpad tool assembly 200 may include a single vacpad body 212 equipped with the vacuum source 217, such as the motor, and the power supply 222, such as a battery, for cordless and/or portable applications. As will be appreciated, the vacpad tool assembly 200 may also be coupled to a standalone compressor motor (not shown), such as by way of a hose, for example.

The support system 250 is removably coupled to the body 212 of the vacpad tool assembly 200 and includes at least one extension tab 252 that receives a threaded knob 256 to secure the at least one extension tab 252 to the body 212, as depicted in FIGS. 11-13. In this example, the at least one extension tab 252 includes a pair of extension tabs 254, each of which receives a threaded knob 256. As depicted in FIG. 11, each extension tab 254 extends outwardly from the body 212 of the vacpad tool assembly 200 to create a shelf-like member that holds and/or supports a portion of a workpiece or other member, such as a portion of trim, molding, or a cabinet. In addition, one extension tab 254 of the pair of extension tabs may be coupled to the top portion 216 of the body 212 at a first end of the body 212 and the other extension tab 254 of the pair of extension tabs may be likewise coupled to the top portion 216 of the body 212 at a second end of the body 212 opposite the first end, as depicted in FIG. 11, for example. In this way, a portion of the workpiece may be placed over each of the extension tabs 254 and supported due at least in part to the location of such extension tabs 254 extending from the body 212.

In addition, each extension tab 254 includes a member 258 having a first portion 260 adapted to be disposed on the top portion 216 of the body 212 and a second portion 262 adapted to extend from the body 212, as depicted in FIG. 11. When not in use, the second portions 262 of the extension tabs 254 may be rotated about 90 degrees such that the second portions 262 are also disposed on the top portion 216 of the body 212, as depicted in FIG. 13. In this configuration, the vacpad tool assembly 200 having the support system 250 coupled thereto may be more easily moved and/stored.

Further, each of the first and second portions 260, 262 of the extension tabs 254 includes a slot 264, as depicted in FIG. 12. The slot 264 may be a longitudinal type slot, which provides a variety of positions along the length of each of the first and second portions 260, 262 for the threaded knob 256 to be disposed. So configured, the first and second portions 260, 262 of the extension tabs 254 are able to be secured to the body 2122 in a variety of positions, depending upon the position of the threaded knob 256 within the slot 264, for example. Once the threaded knobs 256 are disposed within the slots 264 at a desired position, each threaded knob 256 may then be tightened to secure the extension tabs 254 to the body 212. The support system 250 may also be removed to allow for a portion of the track saw 230 or other construction tool to be secured to the vacpad tool assembly 200, as described above relative to FIGS. 8-10, for example.

At least in view of the foregoing, it will be appreciated that the support system 250 used with the vacpad tool assembly 200 is a removable support for holding moldings, trim and/or other portions of a workpiece to flat surfaces. The support system 250 may also act as a support ledge to hold a variety of other objects not limited to trim, moldings, or cabinets, such as any type of construction tool or other object needing a support, for example. While the support system 250 is depicted as being used with the vacpad tool assembly 200 of FIGS. 8-10, it will be appreciated that the support system 250 may alternatively be used with the other vacpad tool assemblies of the present disclosure and still fall within the scope of the present disclosure.

Figure 14:
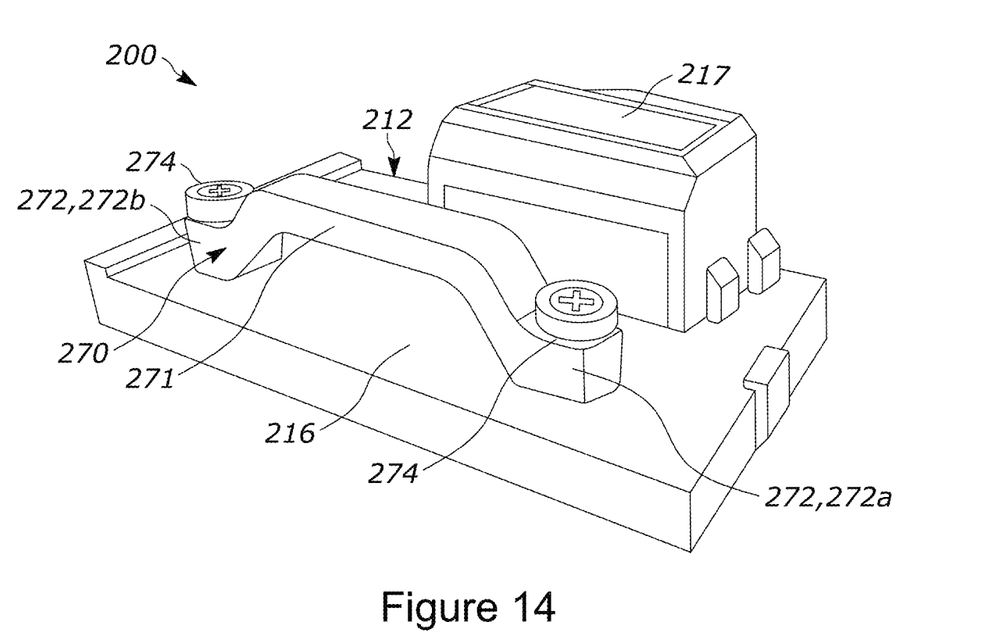
FIG. 14 is a top perspective view of the vacpad tool assembly of FIG. 9 having a handle.

Referring now to FIG. 14, the vacpad tool assembly 200 of FIGS. 8-10 is depicted with a handle 270. In this example, the vacpad tool assembly 200 may include a single vacpad body 212 equipped with the vacuum source 217, such as the motor, and the power supply 222, such as a battery, for cordless and/or portable applications. As will be appreciated, the vacpad tool assembly 200 may also be coupled to a standalone compressor motor (not shown), such as by way of a hose, for example.

The handle 270 is removably coupled to the body 212 of the vacpad tool assembly 200 and includes a gripping portion 271 and a pair of flanges 272 outwardly extending from ends of the gripping portion 271. The pair of flanges 272 includes a first flange 272a extending from one end of the gripping portion 271 and a second flange 272b extending from the other end of the gripping portion 271, as depicted in FIG. 14. Each of the first and second flanges 272a, 272b receives a threaded knob 274 to secure the first and second flanges 272a, 272b to the body 212. In this example, a user may easily grip the gripping portion 271 of the handle 270 before, during and/or after use of the vacpad tool assembly 200, allowing for easy placement and removal of the vacpad tool assembly 200 on a desired work surface, for example.

Figure 15:
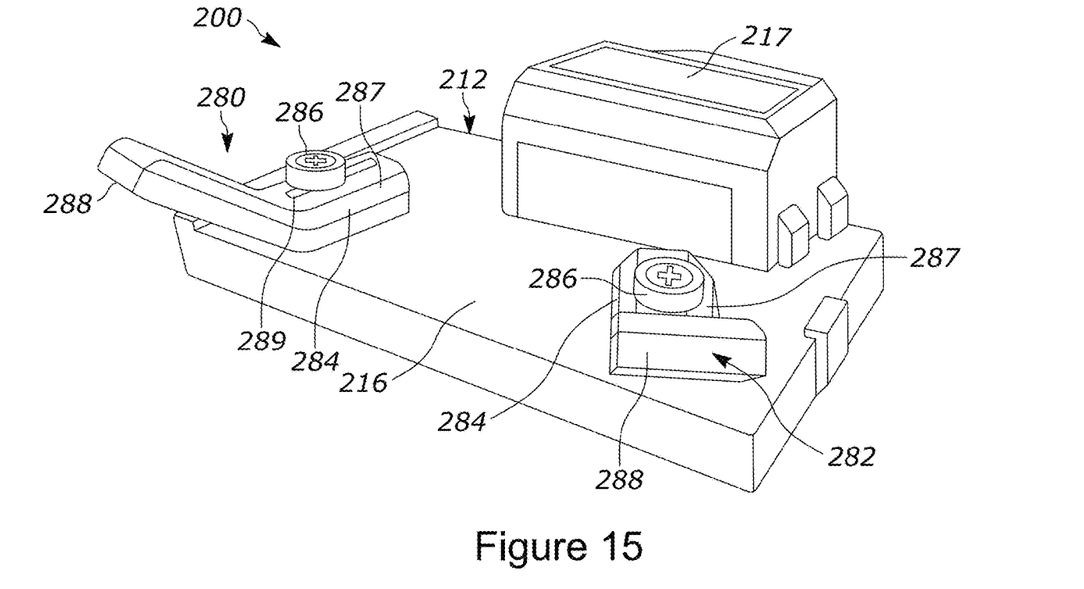
FIG. 15 is another top perspective view of the vacpad tool assembly of FIG. 9 having another support system according to another aspect of the present disclosure coupled thereto.

Referring now to FIG. 15, the vacpad tool assembly 200 of FIGS. 8-10 is depicted with another support system 280. Like the previous examples, the vacpad tool assembly 200 may include the single vacpad body 212 equipped with the vacuum source 217, such as the motor, and the power supply 222, such as a battery, for cordless and/or portable applications. The support system 280 is removably coupled to the body 212 of the vacpad tool assembly 200 and includes at least one extension tab 282 that receives a threaded knob 286 to secure the at least one extension tab 282 to the body 212. In this example, the at least one extension tab 282 includes a pair of extension tabs 284, each of which receives a threaded knob 286.

As depicted in FIG. 15, each extension tab 284 extends outwardly from the body 212 of the vacpad tool assembly 200 to create a shelf-like member that holds and/or supports a portion of a workpiece or other member, such as a portion of crown molding. In addition, one extension tab 284 of the pair of extension tabs may be coupled to the top portion 216 of the body 212 at a first end of the body 212 and the other extension tab 284 of the pair of extension tabs may be likewise coupled to the top portion 216 of the body 212 at a second end of the body 212 opposite the first end, as depicted in FIG. 15, for example. In this way, a portion of the crown molding may be placed over each of the extension tabs 284 and supported due at least in part to the location of such extension tabs 284 extending from the body 212.

In addition, each extension tab 284 includes a first portion 287 adapted to be disposed on the top portion 216 of the body 212 and a second portion 288 adapted to extend from the body 212. The second portion 288 is also disposed upwardly from the first each portion 287 at a desired angle, such as a 45 degree angle from a plane in which the first portion 287 is disposed in this example. As will be appreciated, the second portion 288 may alternatively extend from the first portion 287 at various other angles and still fall within the scope of the present disclosure. So configured, the first and second portions 287, 288, respectively, accommodate various types of work pieces, such as crown molding, having similar angles, making it easier for the support system 280 to capture and secure the crown molding during use of the vacpad tool assembly 200.

When not in use, the second portions 288 of the extension tabs 284 may be rotated about 90 degrees such that the second portions 288 are also disposed on the top portion 216 of the body 212. In this configuration, the vacpad tool assembly 200 having the support system 280 coupled thereto may be more easily moved and/stored.

Further, each of the first and second portions 287, 288 of the extension tabs 284 may include a slot 289. The slot 289 may be a longitudinal type slot, which provides a variety of positions along the length of each of the first and second portions 287, 288 for the threaded knob 286 to be disposed.

So configured, the first and second portions 287, 288 of the extension tabs 284 are able to be secured to the body 212 in a variety of positions, depending upon the position of the threaded knob 286 within the slot 289, for example. Once the threaded knobs 286 are disposed within the slots 289 at a desired position, each threaded knob 286 may then be tightened to secure the extension tabs 284 to the body 212. The support system 280 may again also be removed to allow for a portion of the track saw 230 or other construction tool to be secured to the vacpad tool assembly 200, as described above relative to FIGS. 8-10, for example.

Figure 16:
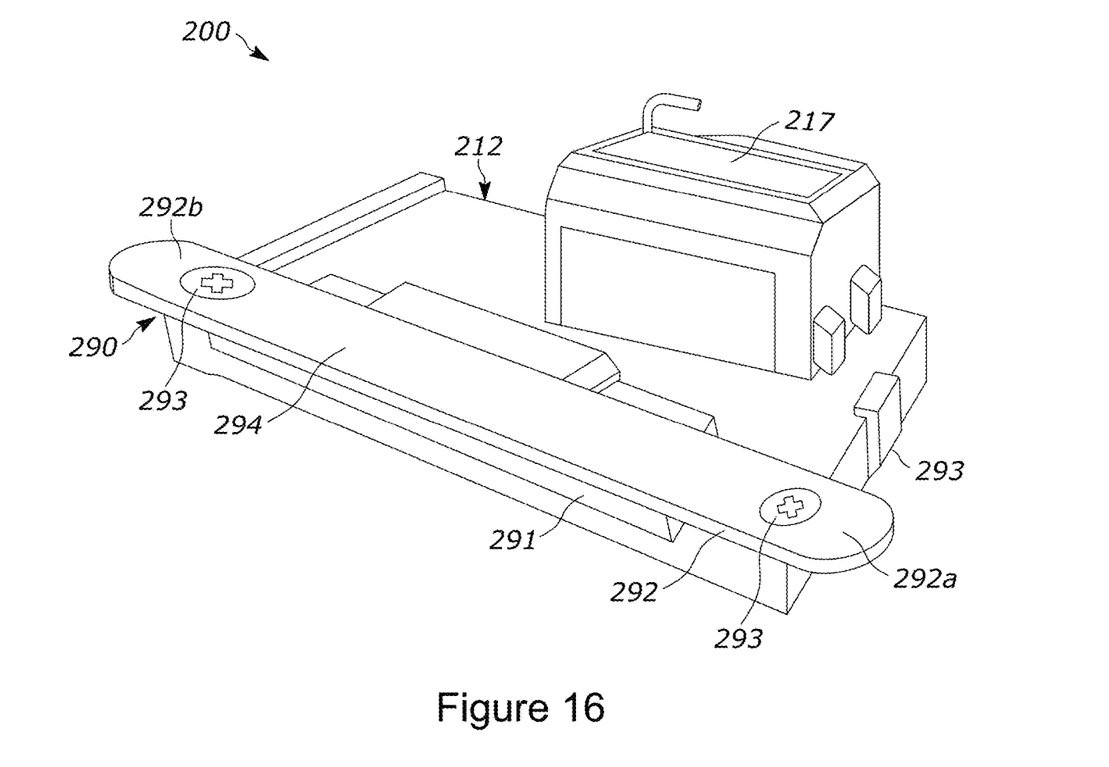
FIG. 16 is another top perspective view of the vacpad tool assembly of FIG. 9 having yet another support system according to another aspect of the present disclosure coupled thereto.

Referring now to FIG. 16, the vacpad tool assembly 200 of FIGS. 8-10 is depicted with a level mounting system 290. Like the previous examples, the vacpad tool assembly 200 may include the single vacpad body 212 equipped with the vacuum source 217, such as the motor, and the power supply, such as a battery, for cordless and/or portable applications.

The level mounting system 290 is removably coupled to the body 212 of the vacpad tool assembly 200 and includes a base 291. The base 291 may be positioned at a central, front portion of the body 212, as depicted in FIG. 16. The level mounting system 290 also includes a bar 292, such as a metal bar, which is disposed on the base 291. The bar 292 includes a first end 292a and a second end 292b disposed opposite to the first end 292a, and each of the first and second ends 292a, 292b includes at least one hole adapted to receive a mounting member 293 to secure the level mounting system 290 to the body 212 of the vacpad tool assembly 200. In one example, and as depicted in FIG. 16, the first and second ends 292a, 292b include a pair of holes 293. In any case, each hole 292a, 292b of the bar 292 aligns with a hole disposed in the body 212 of the vacpad tool assembly 200. In addition, the mounting member 293 may include any known threaded knob, member, screw, insert or other similar member capable of securing the level mounting system 290 to the body 212, for example. As further depicted in FIG. 16, the bar 292 of the level mounting system 290 also includes a top surface 294. So configured, a laser level or any other type of level may be placed onto the top surface 294 of the bar 292 during use of the vacpad tool assembly 200, for example.

Figure 17:
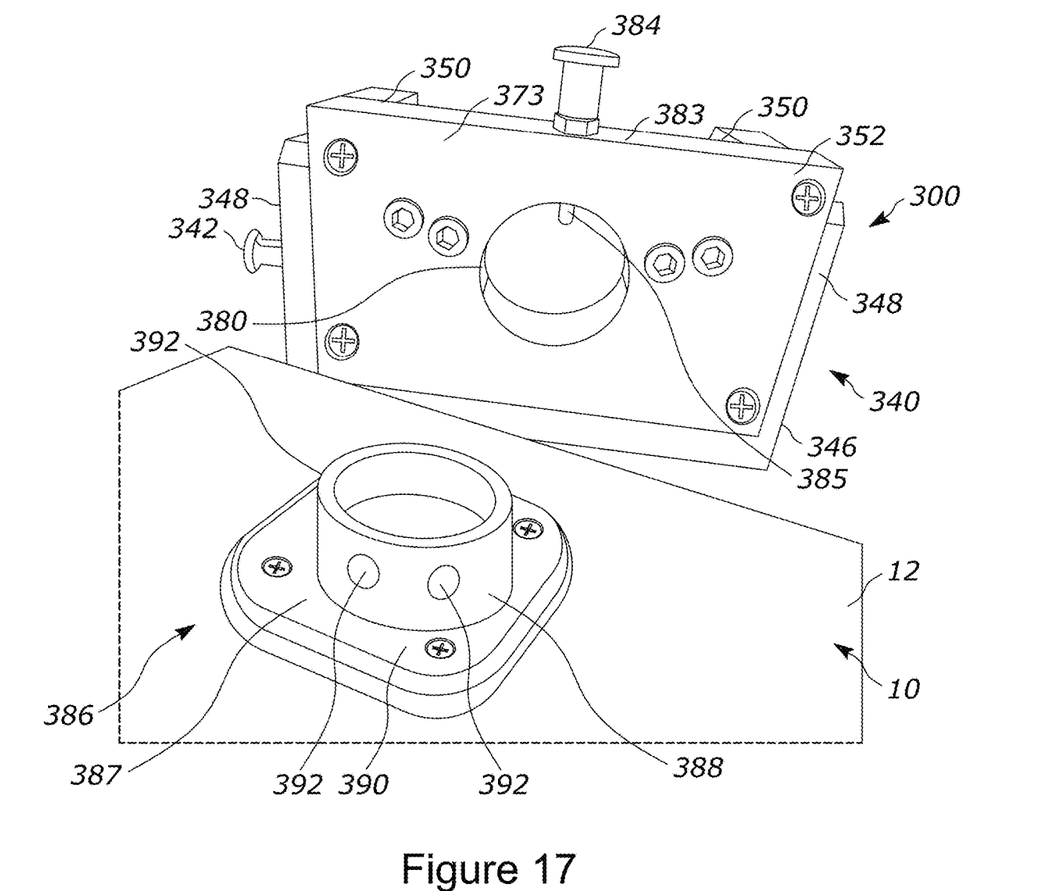
FIG. 17 is a perspective view of portions of another portable vacpad tool assembly according to another aspect of the present disclosure.

Referring now to FIG. 17, portions of another portable vacpad tool assembly 300 according to another aspect of the present disclosure are depicted. The portable vacpad tool assembly 300 includes a tilting mount different from the portable vacpad tool assembly 100 described above, as described more below, but may include many of the same parts of the portable vacpad too assembly 100. Parts of the portable vacpad tool assembly 300 that are the same as the vacpad tool of the vacpad tool assembly 10 and/or the portable vacpad tool assembly 100 use either the same reference number used for the vacpad tool assembly 10 of FIG. 1-4B or a reference number 200 more than the reference numbers used for parts of the portable vacpad tool assembly 100 and are not explained again for the sake of brevity.

The portions of the portable vacpad tool assembly 300 depicted in FIG. 17 include the vacpad tool assembly 10 having the body 12 and at least one side wall 18. In addition, the vacpad tool assembly 10 includes all of the same features described and further includes a flange disposed in the center of the body 12, as described more below.

The portable vacpad tool assembly 300 also includes a mount 340, such as a tilting mount 340, that is adapted to be coupled to the body 12 of the vacpad tool assembly 10. Unlike the mount 40 of the portable vacpad tool assembly 100, the tilting mount 340 includes a locking pin 342 and is adapted to receive a flange of the body 12, as explained more below, and dispose the body 12 at a desired position. The locking pin 342 is adapted to secure the body 12 at the desired position on the titling mount 340.

Specifically, the tilting mount 340 includes a stand 346 and two side walls 348. In addition, a pair of mounting members 350 may be disposed within the two side walls 348, and at least one mounting member includes an aperture for receiving a portion of the locking pin 342 to secure the mounting member in the desired position. Further, a mounting plate 352 is disposed on the pair of mounting members 50 and is adapted to receive the body 12 of the vacpad tool assembly 10.

The mounting members 350 are rotatable about a lateral axis of the tilting mount 340. Specifically, upon moving the locking pin 342 out of the aperture of the at least one mounting member 350, each of the mounting members 350 is able to be rotated about the lateral axis within the side walls 348 of the tiling mount 340.

One side wall 348 of the stand 346 of the tilting mount 340 may include a bore. The bore is configured to receive at least a portion of the locking pin 342 to secure one of the mounting members 350 to the side wall 348 and maintain a desired position of the mounting member 50. By doing so, ultimately the desired position of the mounting plate 352 on which the body 12 of the vacpad tool assembly 10 is disposed is also maintained.

As depicted in FIG. 17, the mounting plate 352 includes an aperture 380 and a side wall 373 with a bore 383 disposed there through for receiving an indexing pin 384. The indexing pin 384 includes an end 385 extending through the bore 383 of the mounting plate 352 and into the aperture 380. In addition, a bottom portion 21 of the body 12 of the vacpad tool assembly 10 includes a flange 386 comprising a base 387 and a body 388 extending outwardly from the base 387. In this example, the body 388 is circular in shape, but it will be appreciated that the body 388 may alternatively take the form of various other shapes and still fall within the scope of the present disclosure. As further depicted, the body 388 includes a plurality of holes 390 disposed around a circumference of the body 388. The plurality of the holes 390 includes at least one hole 392 spaced equidistantly from another hole 392 disposed around the circumference of the body 388 in this example. When the vacpad tool assembly 10 is coupled to the mounting plate 352, the body 388 of the flange 386 is disposed in the aperture 380 of the mounting plate 352, and the indexing pin 384 fits into one of the holes 392 of the plurality of holes 390 disposed on the body 388. So configured, the body 12 of the vacpad tool assembly 10 is able to rotate up to 360 degrees, e.g., around the mounting plate 352, and lock in place when coupled to the mounting plate 352, for example, providing additional overall flexibility to the portable vacpad tool assembly 300.

In view of the foregoing, it will be appreciated that the vacpad tool assembly 10, 200 and portable vacpad tool assembly 100, 300 include several advantages. For example, each of the vacpad tool assembly 10, 200 and portable vacpad tool assembly 100, 300 includes the body 12, 212, such as a simple pad, that comes in both common sizes and custom sizes for all different types of applications, such as in the construction industry. In addition, they can each be modified for different applications, such as to secure large flat panels for edge banding, holding small stock for dominoing or using a biscuit jointer, or to bringing on a jobsite in any area. Moreover, the vacpad tool assembly 10, 200 and the portable vacpad tool assembly 100, 300 either already includes all necessary parts or may be used with parts already readily available. For example, the vacpad tool assembly 10 may be attached to just about any small compressor motor or any kind of vacuum pump, both of which may already be used on a jobsite and are easily purchased at a local hardware store.

The figures and description provided herein depict and describe preferred embodiments of the vacpad tools and portable vacpad tool assembly of the present disclosure for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A portable vacpad tool assembly, comprising:
    a vacpad tool assembly including:
        a body adapted to be removably attached to a surface and coupled to a vacuum source, the body including a top portion, two side walls, and a rear portion;
        a bore formed in the top portion, at least one side wall of the two side walls, and the rear portion; and
    a tilting mount coupled to the body, the tilting mount having a locking pin and a mounting plate with a side wall and tab disposed on the side wall, and the tilting mount adapted to receive the body and dispose the body at a desired position, and the locking pin adapted to secure the body at the desired position on the titling mount, and the tab moveable between a first position and a second position, the first position a position in which the tab contacts a release valve to move the release valve to an open position and the second position a position in which the tab is removed from the release valve and the release valve is in a closed position,
    wherein, upon engagement of a workpiece with the top portion of the body, air from the vacuum source is allowed to be drawn into the bore of the top portion to secure the workpiece to the body of the vacpad tool assembly.

2. The portable vacpad tool assembly of claim 1, wherein the vacpad tool assembly is a first vacpad tool assembly, and the portable vacpad tool assembly further comprises a second vacpad tool assembly onto which the tilting mount is disposed, the second vacpad tool assembly including a body adapted to be removably attached to the surface and coupled to the vacuum source, the body including a top portion, two side walls, a bottom portion, and a bore formed in the top portion and each of the side walls of the two side walls, wherein, upon engagement of a surface with the bottom portion of the body of the second vacpad tool assembly, air from the vacuum source is drawn into the bore of the bottom portion to secure the bottom portion of the body of the second vacpad tool assembly to the surface.

3. The portable vacpad tool assembly of claim 2, wherein the tilting mount further includes a stand disposed on the top portion of the second vacpad tool assembly, the tilting mount having two side walls, a pair of mounting members disposed within the two side walls, and a mounting plate disposed on the pair of mounting members.

4. The portable vacpad tool assembly of claim 3, wherein the mounting plate includes an edge surrounding the plate, the edge configured to help secure the body of the vacpad tool on the mounting plate.

5. The portable vacpad tool assembly of claim 3, wherein the mounting plate comprises a front portion, and the portable vacpad tool assembly further comprises a pair of rotating tabs disposed at the front portion of the mounting plate, the pair of rotating tabs moveable to a substantially vertical position in which the rotating tabs contact the body of the vacpad tool assembly disposed on the mounting plate, further securing the body to the mounting plate, and a substantially horizontal position, in which the rotating tabs are removed from contact with the body of the vacpad tool assembly, allowing the body to be removed from the mounting plate.

6. The portable vacpad tool assembly of claim 2, further comprising the vacuum source disposed in the stand between the two side walls, the vacuum source having at least one tube extending therefrom and coupled to each of the first and second vacpad tool assemblies.

7. The portable vacpad tool assembly of claim 2, further comprising a battery disposed on a base and coupled to one of the side walls, the battery providing power to the vacuum source to create a negative pressure and/or vacuum.

8. The portable vacpad tool assembly of claim 2, wherein one side wall of a stand of the tilting mount includes a bore, the bore for receiving at least a portion of the locking pin to secure a mounting member to the side wall and maintain the desired position of the mounting member and body of the vacpad tool assembly.

9. The portable vacpad assembly of claim 2, wherein a second tube extending from the vacuum source is coupled to the bore in the rear portion of the second vacpad tool assembly, such that, upon application of the vacuum from the vacuum source and contact of the bottom portion of the second vacpad tool assembly with the surface, a valve moves to an open position and the body of the second vacpad tool assembly is secured to the surface via the vacuum.

10. The portable vacpad tool assembly of claim 1, further comprising a valve disposed in the body and extending onto the top portion of the body, the valve moveable between a closed position and an open position, wherein upon contact of the workpiece with the valve, the valve is moved to the open position, allowing air from the vacuum source to be drawn into and through the bore to secure the workpiece to the body of the vacpad tool.

* * * * *